United States Patent Office 3,331,802
Patented July 18, 1967

3,331,802
POLYESTERS FROM DIBASIC ACIDS, MONOBASIC ACIDS, GLYCOLS, AND TRIHYDRIC ALCOHOLS AS PLASTICIZERS FOR VINYL RESINS
Clarence F. Huber, Mount Healthy, Ohio, Harold C. Foulks, Jr., Newport, Ky., and Robert D. Aylesworth, Cincinnati, Ohio, assignors to Emery Industries, Inc., Cincinnati, Ohio, a corporation of Ohio
No Drawing. Filed July 24, 1964, Ser. No. 385,078
30 Claims. (Cl. 260—31.6)

This invention relates to plasticized polyvinyl chloride resins. More particularly it relates to novel compositions of matter adapted for plasticizing polyvinyl chloride and to the resulting plasticized resins.

Polyvinyl chloride resins are manufactured by polymerizing vinyl chloride monomer either alone or in admixture with small proportions of other vinyl monomers, for example, vinyl acetate or vinylidene chloride. For the purpose of the present invention, reference to polyvinyl chloride resin (PVC) refers to the family of polymers produced by the homopolymerization of vinyl chloride or by the copolymerization thereof with other polymerizable monomers. In general, the polyvinyl chloride resins so obtained are hard, tough, and usually brittle materials, which by themselves are not particularly useful in a variety of applications. These characteristics, however, can be avoided by compounding the polyvinyl chloride polymer with a substantial proportion of a plasticizer which acts to soften the resulting resin composition while imparting other favorable physical characteristics thereto, such as improved flexibility and elasticity coupled with toughness and strength. When so modified polyvinyl chloride resins become useful for a wide variety of purposes. Many other product characteristics, however, must also be kept in mind, and the problem faced in the art has been to provide a plasticizing composition which will effect a desired improvement in the physical characteristics of the PVC resin, without impairing the other desirable properties which vinyl resins display, such as a high degree of permanence and resistance to attack by various solvents or the ability to resist volatilization and deterioration on exposure to heat and light.

The plasticizers which have been most extensively employed in the past have comprised esters of various dicarboxylic acids, such as phthalic, azelaic, adipic and sebacic acids, esterified with the common monohydric alcohols which range in molecular size from 6 to 10 carbon atoms. These dibasic esters, however, do not possess the permanence that is required of plasticizers in numerous applications. Because of low molecular weight, their volatility is high and they are readily extracted from vinyl compositions by hexane, mineral oil, soapy water or similar solvents with which the plastic might come into contact.

Some of the problems attendant to the use of dibasic acid esters as plasticizers can be eliminated by the use of polymeric plasticizers. These polymeric plasticizers generally consist of polyesters formed from the reaction of a dicarboxylic acid, a glycol (dihydric alcohol) and a monocarboxylic acid. The monocarboxylic acid employed serves as a chain terminator while the ratio of monobasic acid to dibasic controls the molecular size of the polyester so formed. As the ratio of monocarboxylic acid to dicarboxylic acid is decreased the molecular weight becomes higher and the permanence characteristics, such as resistance to solvent extraction, low volatility and resistance to migration into rubber, lacquer or styrene, is improved.

The polyester plasticizers of this type which are well known to the art are all linear in structure and consequently require a high ratio of dibasic acid to monobasic acid if the polyester is to be compatible with PVC resin and still be of sufficient molecular size to possess the characteristics of a polymeric plasticizer. Generally minimum dicarboxylic to monocarboxylic acid weight ratios of 1:1 to 3:1 are required depending upon the acid and glycol used, because it is essential to keep the percentage of ester groups per mole of plasticizer large enough to impart sufficient compatibility with PVC resin to make it useful as a plasticizer.

It is a primary object of this invention to provide novel polyester plasticizers which can be incorporated into polyvinyl resins to produce plastic compositions, and which do not require the high proportion of dibasic acids required by the polyesters heretofore used to make them compatible with PVC and to prevent them from spewing from the plasticized resin.

A further and more particular object of this invention is to provide plasticizers and plasticized compositions having excellent electrical properties and affording a high degree of resistance to the passage of electrical current therethrough.

Another object of this invention is to provide plasticizers which are resistant to migration from the plasticized resin and which have little tendency to mar and disfigure the surface of other materials with which they come into contact such as styrene or styrene-butadiene (SBR) rubber based materials.

The present invention is based on the discovery that the foregoing and other objects of this invention can be achieved by the use of a novel polymeric plasticizing composition having a molecular weight of from about 700 to 3000 which is prepared by esterifying a reaction mixture incorporating the following ingredients:

(a) A dibasic acid component comprising a dicarboxylic acid or any mixture of dicarboxylic acids selected from the group consisting of alkanedioic acids of 6–13 carbon atoms in the molecule, phthalic acid, isophthalic acid or any anhydrides of said acids;

. (b) A monocarboxylic acid component selected from the group consisting of straight or branched chain alkanoic acids of from 6 to 18 carbon atoms in the molecules, benzoic acid, and alkyl benzoic acid wherein the alkyl group does not exceed 4 carbon atoms;

(c) A trihydric alcohol selected from the group consisting of glycerine, trimethylol propane, trimethylol butane and trimethylol ethane, or mixtures thereof, the amount of said trihydric alcohol present being equivalent to from 5 to 55 percent of the stoichiometric quantity required to esterify all the acids in the mixture;

(d) A glycol component comprising a dihydric alcohol represented by the formula:

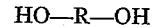

wherein —R— represents an alkylene group containing from 2 to 6 carbon atoms with such structure that only primary and/or secondary and no tertiary hydroxyl groups are present in the molecule, or any mixtures of such glycols, the amount of said glycol being at least that which is sufficient to esterify all the acids which are in excess of that esterified by the trihydric alcohol;

The above acid reactants may be employed in ratios varying from about 70 parts by weight of monobasic acids to about 30 parts by weight of dibasic acid to a ratio of 30 parts by weight of the monobasic acid to 70 parts by weight of a dibasic acid. The trihydric alcohol selected is employed in the exact calculated amount desired in the product while the usual practice is to employ an excess of the glycol (dihydric alcohol) component over the minimum equivalent amount, which excess is distilled off as the esterification reaction is carried to completion.

Esterification and reaction of the components to obtain the desired resinous plasticizer is carried out in accordance with conventional esterification procedures. For example, the necessary components, selected in accordance with the polymer size and structure desired in the plasticizer, are charged into a suitable reaction vessel and heated at atmospheric pressure at temperatures of the order of about 150 to 250° C. for a period of time sufficient to substantially complete esterification. Completion of esterification normally takes place with a heating period of from about 3 to 8 hours. The reaction may be forced to completion by distillation in vacuo (typically 2–50 mm. Hg abs. at 200–250° C.) until a suitably low acid value such as 0.5 to 6 is obtained. Where an excess of the glycol is employed the excess is removed by the distillation in vacuo as are small amounts of volatile esters which might be formed by reaction of the glycol with only monobasic acid. After removal of volatile materials the plasticizer is cooled and is normally ready for use.

If an improvement in color is desired, the product may be bleached by any one or more of the well known and accepted bleaching agents which are commonly used to lighten the color of plasticizers and esters and it can be filtered through a filter aid, charcoal or bleaching clay for further clarification.

Esterification may be facilitated by the use of suitable esterification catalysts, such as phosphoric acid, para-toluene sulfonic acid, stannous oxalate, and an alkyl tin oxide or a similar catalyst in small percentages. The catalyst may be deactivated or removed by filtering or other conventional means after esterification is completed. The polyester can also be made by using an ester of the corresponding dibasic acid or the monobasic acid in which case the polymer is built up through a transesterification reaction. A combination of transesterification and direct esterification can also be used to incorporate the different acids into the polymer chain.

The polyester plasticizers so formed contain branched polymer chain structures and cross linking between chains resulting from the incorporation of the trihydric alcohol into their composition. The polyester plasticizers for PVC resins previously known to the art differ from these improved polyesters of this invention in that they are linear polyesters devoid of chain branching and cross linking. The branched chain structures are responsible for the improvement in compatibility and the higher electrical resistance of these polyesters. The branched structure is also less susceptible to migration and thereby the plasticizer has very little tendency to attack and mar substances with which it may come into contact.

The incorporation of a trihydric alcohol into the polyester structure produces an increase in molecular weight without requiring any change in the porortions of monobasic and dibasic acids, so that the desirable properties of permanence in PVC are improved while maintaining a high proportion of the more readily available and lower cost monobasic acid.

The ratio of monobasic acid to the total amount of carboxylic acids employed as well as the ratio of triol to total carboxylic acids is very important, because the proportions of these reactants will control the molecular weight of the polyester. Since mixtures of mono and dicarboxylic acids in addition to mixtures of glycols and tricols are used, a diversity of molecular types will be formed. Thus, the composition and molecular weight controlled by the materials in the original esterification mixture is the average composition of the polyester plasticizer in its finished form.

The monobasic acids employed in forming the polyester plasticizers of the present invention may be branched or straight chain alkanoic acids, containing from about 6 to 18 carbon atoms in the molecule. Representative acids suitable for use in practicing this invention are heptanoic caprylic, pelargonic, capric, undecylic, lauric, myristic, palmitic, stearic, ethylhexanoic and isodecanoic acids. Mixtures of these acids can also be employed, representative mixed acids starting materials being those derived from the splitting (hydrolysis) of coconut oil or tallow, or the mixture obtained by mixing any proportions of the aforementioned acids. Particularly good results have been obtained in preparing the polyesters of this invention by using mixtures containing lauric, myristic, palmitic and stearic acids. In addition, aromatic acids previously used in polyvinyl plasticizers may be used such as benzoic or alkyl benzoic acids, wherein the alkyl group has up to 4 carbon atoms, e.g. ethylbenzoic.

The dibasic acids used in forming the polyester plasticizer, may be as stated above, either aliphatic or aromatic or mixtures thereof. The aromatic acids which may be employed comprise phthalic acid, isophthalic acid and their various anhydrides. The aliphatic dicarboxylic acids which may be employed are those (alpha, omega-alkane dioic acids) which contain from 6–13 carbon atoms in the molecule as represented by adipic, suberic, azelaic, sebacic, dodecandioic and brassylic acids, as well as anhydrides of said acids.

The trihydric alcohols employed to produce branching and cross linking in the polymer chain are glycerine, trimethylol ethane, trimethylol propane, and trimethylol butane or any mixtures thereof. The amount of the trihydric alcohol employed in the mixture should be equivalent to that quantity required to esterify more than 5% but less than 55% of all acids (both monobasic and dibasic) in the reaction mixture, thereby controlling the degree of chain branching and cross linking in the polymer chain to such extent that a polyester is obtained with molecular weight and viscosity suitable for use as a plasticizer. When the proportion of triol (trihydric alcohol) employed in the reaction approaches an amount that is approximately equivalent to all (100%) of the acids (both mono and dibasic) a high molecular weight polyester with excessive cross linking and branching is formed. Such a polyester is of the alkyd resin type, has a very high viscosity, is tacky and sticky in nature and is in general completely unsuitable for plasticizing PVC resin.

The glycols employed in combination with the trihydric alcohols are dihydric alcohols containing from 2 to 6 carbon atoms which may be of either straight or branched structure. The hydroxyl groups may be of either primary or secondary type but glycols containing a tertiary hydroxyl group are unsatisfactory for the preparation of these polyesters. Examples of these glycols are: ethylene glycol, 1,2 propylene glycl, 1,3 propylene glycol, neopentyl, glycol, 1,3 butylene glycol, 1,4 butanediol, 2 methyl-2-ethyl-1,3-propanediol, and any mixtures of these glycols. The preferred glycols are ethylene glycol, propylene glycol and mixtures of neopentyl glycol with either ethylene or propylene glycol. The glycol is used in amount at least equivalent to the acids not esterified by the triol, but an excess may be employed. These glycols are of lower boiling point than the triols so that the excess is later removed during a stripping operation. Hence their use in excess does not materially affect the final make up of the plasticizer molecule. To accelerate the rate of reaction and complete the entire reaction more quickly, it is the general practice to employ an excess of the glycol.

The novel plasticizers of this invention, as defined above, can be employed in varying proportions to prepare vinyl formulations with a wide range of properties. The proportion of plasticizer used may vary from about 5 to about 150 parts by weight per hundred parts of resin (phr.). These plasticizers can be used alone or in mixtures of these plasticizers or they may be formulated together with other suitable plasticizers from the prior art, such as, for example, epoxidized fatty acid esters, phthalate esters, azelaic acid esters, polymeric plasticizers and hydrocarbons.

The polyvinyl chloride composition may also contain stabilizers to protect the resin from degradation and decomposition by light and heat, fillers, pigments, dyes for coloring, mold lubricants and other additives as are well known to those familiar with the art.

In order to point out more fully and to better describe the nature of the present invention, the following examples illustrate the invention in various of its complete specific embodiments. All parts are by weight unless otherwise indicated.

*Example I*

A polyester plasticizer was made by esterification of the following materials:

| | Parts |
|---|---|
| Azelaic acid | 100 |
| Phthalic anhydride | 400 |
| Pelargonic acid | 250 |
| $C_{12}$–$C_{14}$–$C_{16}$–$C_{18}$ fatty acid mixture | 250 |
| Trimethylol propane (20%) [1] | 80 |
| Ethylene glycol (100%) [1] | 260 |

[1] Percentage of alcohol based on total equivalents of acids.

With respect to the general polyester formulation discussed previously the trimethylol propane is equivalent to 20% of the acids and the 100% of ethylene glycol provides an excess of 20% to aid in driving the reaction to completion. The esterification was carried out by charging the above materials into a 3-necked, round-bottom flask equipped with a suitable agitator, a thermometer, and a medium length Vigreaux distillation column and condenser. The condenser was so arranged that material could be distilled from the reaction at either atmospheric or reduced pressure. The mixture was esterified by slowly heating the contents of the flask to approximately 225–235° C., while the water formed was slowly distilled out through the column and condensed. The temperature was held at this level, at atmospheric pressure, until the reaction slowed down materially as evidenced by a reduced rate of water evolution. When this point was reached, the mixture was subjected to distillation under reduced pressure to held complete the reaction and to removed excess ethylene glycol. Specifically, the pressure was reduced gradually by use of a vacuum pump, with the temperature at 220–250° C., at such a rate that a controlled distillation of volatile materials took place to a final pressure of 2 mm. Hg at 235° C. The progress of the esterification was followed by determining the acid value, while the amount of excess glycol removed was measured by means of hydroxyl value determinations. When the acid value reached a level below 2.0 and the hydroxyl value a level below 20, the reaction was considered complete. The esterification mixture was then cooled to room temperature and filtered, using diatomaceous earth as a filter aid. The resulting product was a clear, amber-colored liquid which was somewhat viscous and had a very low volatility. This liquid was evaluated as a plasticizer without further processing or modification. When incorporated into PVC resin it produced a clear pliable sheet and was compatible with the resin.

*Example II*

A polyester plasticizer was made by esterification of the following materials:

| | Parts |
|---|---|
| Phthalic anhydride | 783 |
| Azelaic acid | 494 |
| Pelargonic acid | 1520 |
| Glycerine (11%) [1] | 88 |
| Propylene glycol (114%) [1] | 1100 |

[1] Percentage of alcohol based on total equivalents of acids.

With respect to the above formulation, the glycerine is equivalent to approximately 11% of the acids and the 114% of propylene glycol provides a 25% excess of hydroxyl groups to force the reaction to completion. The mixture was esterified in accordance with the procedure of Example I. The resulting product was a clear amber liquid which was compatible with PVC resin.

*Example III*

A polyester plasticizer was made by esterification of the following materials:

| | Parts |
|---|---|
| Azelaic acid | 600 |
| Phthalic anhydride | 600 |
| Pelargonic acid | 400 |
| Trimethylol propane (22%) [1] | 168 |
| Propylene glycol (103%) [1] | 665 |

[1] Percentage of alcohol based on total equivalents of acids.

The trimethylol propane is equivalent to 22% of the acids and an excess of propylene glycol is used to drive the reaction to completion. This mixture was esterified in accordance with the procedure of Example I. The resulting product was a clear amber somewhat viscous liquid of low volatility. It was completely compatible with PVC resin.

*Example IV*

A polyester plasticizer was made by esterification of the following materials:

| | Parts |
|---|---|
| Azelaic acid | 200 |
| Phthalic anhydride | 200 |
| $C_{12}$–$C_{14}$–$C_{16}$–$C_{18}$ fatty acid mixture | 600 |
| Trimethylol propane (10%) [1] | 34 |
| Neopentyl glycol (50%) [1] | 195 |
| Propylene glycol (65%) [1] | 185 |

[1] Percentage of alcohol based on total equivalents of acids.

The trimethylol propane is equivalent to 10% of the acids and the glycols provide the excess of alcoholic OH used to force the reaction to completion. This excess is removed during the stripping operation. This mixture was esterified in accordance with the procedure of Example I. The resulting plasticizer was somewhat viscous, clear and light amber in color. When incorporated into PVC resin, it produced clear pliable sheet from which the plasticizer did not spew.

The compatibility of the novel plasticizers of this invention were compared to similar plasticizers which did not contain a trihydric alcohol. The compatibility tests were carried out as follows:

The following materials were mixed together in a stainless steel beaker by hand mixing with a spatula:

| | Grams |
|---|---|
| PVC resin Geon 101 | 100 |
| Ferro 1820 stabilizer | 2 |
| Ferro 903 stabilizer | 1 |
| Plasticizer | 70 |

These materials were then poured onto the rolls of a standard two-roll rubber mill, with 6 inch x 12 inch rolls which were heated to a temperature of 170° C. and set for a sheet thickness of approximately 0.25 inch. The mixture was milled for approximately 10 minutes then removed in the form of a sheet. A molded sheet was then prepared by pressing 65 grams in a chrome plated ASTM mold with a cavity of 6 inch x 6 inch x 0.075 inch in a hydraulic press at 177° C. for six minutes with a final pressure of 1500 pounds per square inch. From the molded sheet a 6 inch x 3 inch x 0.075 inch strip was cut, and rolled around a ¼ inch diameter stainless steel mandrel. Rubber bands were placed around the rolled sheet to hold it in place then the mandrel was removed. After 5 hours at 75° C. in a constant temperature room the sheet was unrolled and the innermost turn was inspected for spew or exudation. Under the mechanical stress caused by distortion of the sample an incompatible plasticizer is forced from the plastic and appears on the surface as a layer of liquid. The various series of plasticizers listed in Tables I, II and III illustrate the improvement in compatibility that is obtained with the plasticizers of this invention.

The resistance of these novel plasticizers to attack upon SBR rubber were also compared to similar plasticizers which lacked a triol. The tests were carried out as follows:

In accordance with the procedure described above a molded sheet was prepared in a 6 inch by 6 inch by 0.020 inch ASTM mold. From the moldings a 2 inch x 2 inch x 0.020 inch specimen was cut. After being weighed, the sample was placed between two (2 inch x 2 inch) sheets of SBR paper (a porous paper impregnated with SBR rubber). The specimen and paper were then sandwiched between two glass plates and a one pound weight placed on top to impart a quarter pound pressure per square inch. This entire assembly was then placed in an oven and held at 70° C. for 7 days. The plastic specimen was then reweighed and the percentage of weight lost was calculated. The data in Table I shows a definite superiority for the plasticizers of this invention in regard to migration of the plasticizer into SBR rubber.

Tests were made to determine the resistance of these novel plasticizers to the passage of electrical current. The volume resistivity of the polyester plasticizer was determined by placing the liquid plasticizer at 25° C. in a 600 ml. beaker. A pair of electrodes, made of Monel metal measuring approximately 38 mm. x 38 mm. and mounted 13.0 mm. apart were lowered into the plasticizer and a 500 volt current applied across the electrodes. The resistance was measured with a resistance bridge (Type 544-B General Radio Corporation), the volume resistivity being calculated by the formula:

$$\text{Volume resistivity (ohm-cm.)} = \frac{A}{d} R$$

where $R$=resistance in ohms, $A$=area of the face of an electrode in cm.$^2$ and $d$=distance between electrodes in cm.

The data of Tables II and III illustrates the improvement in electrical resistance that is obtained from the novel plasticizers of this invention. In both instances the

TABLE I

| | Example | | | | | | |
|---|---|---|---|---|---|---|---|
| | 1 | 2 | 3 | 4 | 5 | 6 | 7 |
| Composition (parts by weight): | | | | | | | |
| Azelaic Acid | 30 | 25 | 30 | 25 | 25 | 25 | 10 |
| Phthalic Anhydride | 20 | 25 | 20 | 15 | 15 | 25 | 40 |
| C$_{12}$–C$_{18}$ Mono Acids [1] | 50 | 50 | 50 | 60 | 60 | 50 | 50 |
| Trimethylol Propane (percent equivalents) | 10 | 15 | 20 | | 10 | | |
| Glycerine (percent equivalents) | | | | 10 | | | |
| Propylene Glycol (percent equivalents) | 90 | 85 | 80 | 90 | 90 | 100 | 100 |
| Compatibility | Comp. | Comp. | Comp. | Comp. | Comp. | Incomp. | Incomp. |
| SBR Migration Test (percent Wgt. Loss) | 0.93 | 0.77 | 0.32 | 1.8 | 1.9 | 3.6 | 3.7 |

[1] C$_{12}$–C$_{18}$ Mono Acids is a mixture of C$_{12}$, C$_{14}$, C$_{16}$ and C$_{18}$ saturated fatty acids.

The composition is given in parts by weight for the acids and the diols and triols are given in percent of equivalents of acid esterified by each.

plasticizers with trihydric alcohols in their composition are observed to be significantly superior to the similar polyester without a triol.

TABLE II

| | Example | | |
|---|---|---|---|
| | 8 | 9 | 10 |
| Composition (parts by weight): | | | |
| Isophthalic Acid | 40 | 40 | 40 |
| C$_{12}$–C$_{18}$ Mono Basic Acids | 60 | 60 | 60 |
| Trimethylol Propane (percent equivalents) | | 10 | |
| Glycerine (percent equivalents) | | | 10 |
| Propylene Glycol (percent equivalents) | 100 | 90 | 90 |
| Compatibility | Incomp. | Comp. | Comp. |
| Volume Resistivity of Plasticizer at 25° C. ohm-cm | 36×10$^9$ | 48×10$^9$ | 60×10$^9$ |

TABLE III

| | Example | | | | |
|---|---|---|---|---|---|
| | 11 | 12 | 13 | 14 | 15 |
| Composition (parts by weight): | | | | | |
| Azelaic Acid | 20 | 20 | 17 | 20 | 20 |
| Phthalic Anhydride | 20 | 20 | 17 | 20 | 20 |
| C$_{12}$–C$_{18}$ Mono Basic Acids | 60 | 60 | 66 | 60 | 60 |
| Trimethylol Propane (percent equivalents) | 20 | | 30 | 50 | |
| Glycerine (percent equivalents) | | 30 | | | |
| Propylene Glycol (percent equivalents) | 80 | 70 | 70 | 50 | 100 |
| Compatibility | Comp. | Comp. | Comp. | Comp. | Incomp. |
| Volume Resistivity of Plasticizer at 25° C. ohm-cm | 3.6×10$^9$ | 16.3×10$^9$ | 17.3×10$^9$ | 15.9×10$^9$ | 0.8×10$^9$ |

The improvement in electrical resistance properties in the plasticized PVC resin that is effected by the use of plasticizers of this invention can also be illustrated by preparing a plasticizer-resin formulation having the following composition:

| | Grams |
|---|---|
| PVC resin (Geon 101) | 100 |
| Plasticizer | 55 |
| Burgess Pigment No. 30 (a clay filler) | 7 |
| Dythal (a dibasic lead phthalate marketed by National Lead Company) | 10 |

The above materials were milled for 5 minutes on a standard 6 x 12 inch, 2-roll rubber mill at 170° C., in the same manner previously described, then removed from the mill as a sheet of approximately 0.030 inch in thickness. A circular sheet 8 inches in diameter and 0.050 inch in thickness was prepared by pressing in a mold at 177° C. for 2 minutes without pressure, 2 minutes at 450 pounds per square inch and finally 4 minutes at 1500 per square inch. The mold was finally cooled and the sheet removed. Using the test specimens thus prepared, the volume resistivity was measured following the standard method of ASTM Method No. D–257–58. The volume resistivity at 90° C. of plasticized vinyl resins using these novel polyester plasticizers are compared to a similar plasticizer containing no triol in Table IV. The superiority of the plasticizers of this invention is clearly evident from the data.

The improved stability of the polyester plasticizers of this invention on exposure to high temperature aging when compared to previously known plasticizers is also demonstrated by further data in Table IV. The tests were carried out as follows:

Employing the formulation, milling and pressing method above, pressed sheets 6 inches x 6 inches x 0.040 inch were prepared. Using a Type C Dumbell Die as specified in ASTM D–412–61T test method, specimens were cut from the sheets, weighed on an analytical balance, then placed in a circulating air oven at 136° C. for 7 days. Unaged samples were retained as control specimens for reference. At the end of the aging period, the losses in weight, tensile strength and elongation were determined on all samples. The results show that the plastic PVC compositions plasticized with the polyesters containing a triol retain their original plasticity under severe aging conditions to a high degree, whereas the plasticizers heretofore known in the art lose most of their plasticizing action resulting in deterioration and decomposition of the vinyl plastic.

The resistance of these novel plasticizers to mar styrene when the plasticized PVC comes into contact with such surfaces as compared to plasticizers previously known to the art was demonstrated in the following maner:

One hundred parts PVC resin (Geon 101), 2 parts Ferro 1820 stabilizer, 1 part Ferro 903 stabilizer, and 70 parts of plasticizer were milled and press molded sheets 6 inches x 6 inches x 0.020 inch were prepared in accordance with the methods heretofore described. Test specimen 1 inch x 1 inch are die cut from the sheet and placed in contact with the glossy surface of a piece of polystyrene wall board. A piece of cardboard (1 inch x 1 inch) is placed on top of the specimen and over the cardboard was placed a one pound weight so that a uniform pressure was exerted over the entire test specimen. The test specimens, thus prepared were placed in a circulating air oven at 70° C. for 7 days, after which they were removed from the oven and the styrene surface which had contacted the plastic was visually examined for evidence of mar caused by the plasticizer. The results shown in Table V were obtained. The data shows that the example of the heretofore known plasticizers mars and disfigures the styrene surface very badly, whereas the plasticizers of this invention have very little effect upon the styrene under the severe conditions of this test.

TABLE V

| | Example | | |
|---|---|---|---|
| | 19 | 20 | 21 |
| Composition (parts by weight): | | | |
| Azelaic Acid | 25 | 30 | 25 |
| Phthalic Anhydride | 25 | 30 | 25 |
| $C_{12}$-$C_{18}$ Monobasic Acids | 25 | | 25 |
| Pelargonic Acids | 25 | 40 | 25 |
| Trimethylol Propane (Percent Equivalents) | 20 | 20 | |
| Propylene Glycol (Percent Equivalents) | 80 | 80 | 100 |
| Styrene Mar Test 7 days at 70° C | (¹) | (¹) | (²) |

¹ Very slight trace of mar.
² Mars and softens styrene badly. Sample sinks into styrene.

It is of course understood that the foregoing examples are illustrative only and that numerous polyesters other than those specifically set forth fall within the scope of this invention and can be incorporated into polyvinyl chloride resins to achieve the advantages outlined in this specification.

What we claim is:

1. A polymeric plasticizing composition having a molecular weight of from about 700 to 3000 which is prepared by esterifying a reaction mixture incorporating the following ingredients:

(a) a dibasic acid component comprising a dicarboxylic acid or anhydride thereof selected from the group consisting of alkanedioic acids of 6 to 13 carbon atoms in the molecule, phthalic acid, isophthalic acid, and mixtures thereof;

(b) a monocarboxylic acid component selected from

TABLE IV

| | Example | | |
|---|---|---|---|
| | 16 | 17 | 18 |
| Composition (parts by weight): | | | |
| Azelaic Acid | 15 | 30 | 25 |
| Phthalic Anhydride | 25 | 20 | 25 |
| $C_{12}$-$C_{18}$ Mono Basic Acids | 60 | 50 | 50 |
| Glycerine (percent equivalents) | 10 | | |
| Trimethylol Propane (percent equivalents) | | 20 | |
| Propylene Glycol, percent | 90 | 80 | 100 |
| Volume Resistivity of Plasticized PVC Formula in ohm-cm. (55 phr.) | 1.1×10¹² | 0.8×10¹² | 0.17×10¹² |
| Accelerated Heat Aging Test, 55 phr. for 7 days, 136° C.: | | | |
| Percent Weight Lost | 2.2 | 1.8 | 8.0 |
| Percent Retention of Elongation | 95 | 100 | 40 |
| Percent Retention of Tensile Strength | 99 | 100 | | the group consisting of straight or branched chain alkanoic acids of from 6 to 18 crabon atoms in the molecule, benzoic acid and alkyl benzoic acids wherein the alkyl group does not exceed 4 carbon atoms;

(c) a trihydric alcohol selected from the group comprising glycerine, trimethylol propane, trimethylol ethane, trimethylol butane and mixtures thereof, said trihydric alcohol being present in such proportions that is equivalent to from 5 to 55 percent of the stoichiometric quantity required to esterify all the monobasic and dibasic acids in the reaction mixture;

(d) a glycol component comprising a dihydric alcohol represented by the formula:

HO—R—OH wherein —R— represents an alkylene group containing from 2 to 6 carbon atoms with such structure that no tertiary hydroxyl groups are present in the molecule, the amount of said glycol being at least that which is sufficient to esterify all the acids which are in excess of that esterified by the trihydric alcohol;

the above carboxylic acids being employed in such quantities that the monocarboxylic acids constitute from 30% to 70% of the total carboxylic acid content in the esterification mixture.

2. A polyester plasticizer composition as set forth in claim 1 wherein the dicarboxylic acid comprises a mixture of phthalic anhydride and azelaic acid.

3. A polyester plasticizer composition as set forth in claim 1 wherein the dicarboxylic acid is isophthalic acid.

4. A polyester plasticizer composition as set forth in claim 1 wherein the dicarboxylic acid is adipic acid.

5. A polyester plasticizer composition as set forth in claim 1 wherein the trihydric alcohol is glycerine.

6. A polyester plasticizer composition as set forth in claim 1 wherein the trihydric alcohol is trimethylol propane.

7. A polyester plasticizer composition as set forth in claim 1 wherein the dihydric alcohol is propylene glycol.

8. A polyester plasticizer composition as set forth in claim 1 wherein the dihydric alcohol is ethylene glycol.

9. A polyester plasticizer composition as set forth in claim 1 wherein the monocarboxylic acid comprises a mixture of lauric, myristic, palmitic and stearic acids.

10. A polyester plasticizer composition as set forth in claim 1 wherein the monocarboxylic acid comprises a mixture of pelargonic, lauric, myristic, palmitic and stearic acids.

11. A polyester plasticizer composition as set forth in claim 1 wherein the monocarboxylic acid is pelargonic acid.

12. A polyester plasticizer composition as set forth in claim 1 wherein the dihydric alcohol comprises a mixture of neopentyl glycol and ethylene glycol.

13. A polyester plasticizer composition as set forth in claim 1 wherein the dicarboxylic acid comprises a mixture of phthalic anhydride and azelaic acid, the monocarboxylic acid comprises a mixture of lauric, myristic, palmitic, and stearic acids, the trihydric alcohol is trimethylol propane and the dihydric alcohol is 1,2-propylene glycol.

14. A polyester plasticizer composition as set forth in claim 1 wherein the dicarboxylic acid is a mixture of phthalic anhydride and azelaic acid, the monocarboxylic acid comprises a mixture of lauric, myristic, palmitic, and stearic acids, the trihydric alcohol is glycerine and the dihydric alcohol comprises 1,3-propylene glycol.

15. A polyester plasticizer composition as set forth in claim 1, wherein the dicarboxylic acid comprises a mixture of azelaic acid and phthalic anhydride, the monocarboxylic acid is pelargonic acid, the trihydric alcohol is trimethylol propane and the dihydric alcohol comprises a mixture of neopentyl glycol and ethylene glycol.

16. A plasticized polyvinyl chloride composition incorporating therein at least 5 phr. of a polyester composition having a molecular weight of from 700 to 3000 which is prepared by esterifying a reaction mixture incorporating the following ingredients:

(a) a dibasic acid component comprising a dicarboxylic acid or anhydride thereof selected from the group consisting of alkanedioic acids of 6 to 13 carbon atoms in the molecule, phthalic acids, isophthalic acids, and mixtures thereof;

(b) a monocarboxylic acid component selected from the group consisting of straight or branched chain alkanoic acids of from 6 to 18 carbon atoms in the molecules, benzoic acid and alkyl benzoic acids wherein the alkyl group does not exceed 4 carbon atoms;

(c) a trihydric alcohol selected from the group comprising glycerine, trimethylol propane, trimethylol ethane, trimethylol butane and mixtures thereof, said trihydric alcohol being present in such proportion that it is equivalent to from 5 to 55 percent of the stoichiometric quantity required to esterify all the acids in the reaction mixture;

(d) a glycol component comprising a dihydric alcohol represented by the formula:

HO—R—OH wherein —R— represents an alkylene group containing from 2 to 6 carbon atoms with such structure that tertiary hydroxyl groups are not present in the molecule, or any mixtures of such glycols, the amount of said glycol being at least that which is sufficient to esterify all the acids which are in excess of that esterified by the trihydric alcohol;

the above carboxylic acids being employed in such quantities that the monocarboxylic acids constitute from 30% to 70% of the total carboxylic acid content in the esterification mixture.

17. A plasticized polyvinyl chloride composition incorporating therein at least 5 phr. of a polyester plasticizer composition as set forth in claim 2.

18. A plasticized polyvinyl chloride composition incorporating therein at least 5 phr. of a polyester plasticizer composition as set forth in claim 3.

19. A plasticized polyvinyl chloride composition incorporating therein at least 5 phr. of a polyester plasticizer composition as set forth in claim 4.

20. A plasticized polyvinyl chloride composition incorporating therein at least 5 phr. of a polyester plasticizer composition as set forth in claim 5.

21. A plasticized polyvinyl chloride composition incorporating therein at least 5 phr. of a polyester plasticizer composition as set forth in claim 6.

22. A plasticized polyvinyl chloride composition incorporating therein at least 5 phr. of a polyester plasticizer composition as set forth in claim 7.

23. A plasticized polyvinyl chloride composition incorporating therein at least 5 phr. of a polyester plasticizer composition as set forth in claim 8.

24. A plasticized polyvinyl chloride composition incorporating therein at least 5 phr. of a polyester plasticizer composition as set forth in claim 9.

25. A plasticized polyvinyl chloride composition incorporating therein at least 5 phr. of a polyester plasticizer composition as set forth in claim 10.

26. A plasticized polyvinyl chloride composition incorporating therein at least 5 phr. of a polyester plasticizer composition as set forth in claim 11.

27. A plasticized polyvinyl chloride composition incorporating therein at least 5 phr. of a polyester plasticizer composition as set forth in claim 12.

28. A plasticized polyvinyl chloride composition incorporating therein at least 5 phr. of a polyester plasticizer composition as set forth in claim 13.

29. A plasticized polyvinyl chloride composition incorporating therein at least 5 phr. of a polyester plasticizer composition as set forth in claim 14.

30. A plasticized polyvinyl chloride composition incorporating therein at least 5 phr. of a polyester plasticizer composition as set forth in claim 15.

References Cited

UNITED STATES PATENTS

| | | | |
|---|---|---|---|
| 2,838,428 | 6/1958 | Bohrer | 260—31.6 |
| 3,049,506 | 9/1962 | Kibler et al. | 260—31.6 |
| 3,182,041 | 5/1965 | Watkins et al. | 260—76 |

MORRIS LIEBMAN, *Primary Examiner.*

L. T. JACOBS, *Assistant Examiner.*